United States Patent
Prasad et al.

(10) Patent No.: US 11,403,186 B1
(45) Date of Patent: Aug. 2, 2022

(54) ACCELERATING BACKUP BY WRITING TO PERFORMANCE RANKED MEMORY

(71) Applicant: EMC IP Holding Company LLC, Hopkinton, MA (US)

(72) Inventors: Parmeshwr Prasad, Bangalore (IN); Bing Liu, Tianjin (CN); Rahul Deo Vishwakarma, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 17 days.

(21) Appl. No.: 17/149,146

(22) Filed: Jan. 14, 2021

(51) Int. Cl.
*G06F 11/14* (2006.01)
(52) U.S. Cl.
CPC ...... *G06F 11/1464* (2013.01); *G06F 11/1448* (2013.01); *G06F 11/1469* (2013.01)
(58) Field of Classification Search
CPC ............. G06F 11/1448; G06F 11/1464; G06F 11/1469

USPC ......................................................... 711/162
See application file for complete search history.

(56) References Cited

U.S. PATENT DOCUMENTS

| | | | |
|---|---|---|---|
| 2017/0039242 A1* | 2/2017 | Milton | H04W 4/02 |
| 2017/0315875 A1* | 11/2017 | Tirupati Nagaraj | G06F 11/1451 |
| 2018/0310121 A1* | 10/2018 | Milton | H04W 4/029 |
| 2020/0104056 A1* | 4/2020 | Benisty | G06F 3/0688 |
| 2021/0406167 A1* | 12/2021 | Frolikov | G06F 3/061 |

\* cited by examiner

*Primary Examiner* — Than Nguyen
(74) *Attorney, Agent, or Firm* — Workman Nydegger

(57) ABSTRACT

One example method includes selecting a best performing memory for an operation. A data protection system may maintain a global view of performance data for multiple namespaces. The performance data may reflect latency and/or bandwidth for each of the namespaces. The global view may be updated. When performing an operation, the best performing namespace can be selected from the global view based on performance.

20 Claims, 5 Drawing Sheets

System Locality Latency and Bandwidth Information (Type 1):
Type: 0x0001
Reserved: 0x0000
Length: 0x00000084
Flags: 0x2f
Data Type: 0x05
Reserved: 0x0000
Number of Initiator PDs: 0x00000004
Number of Target PDs: 0x00000006
Reserved: 0x00000000
Entry Base Unit: 0x0000000000000000

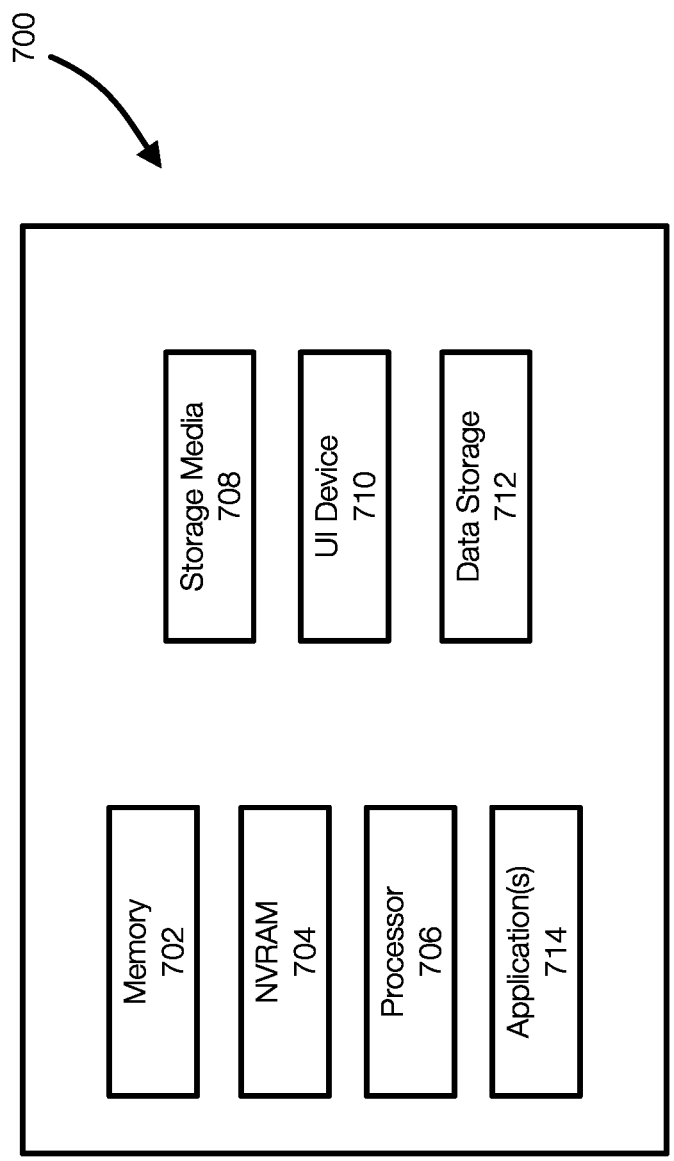

ACCELERATING BACKUP BY WRITING TO PERFORMANCE RANKED MEMORY

FIELD OF THE INVENTION

Embodiments of the present invention generally relate to data protection operations. More particularly, at least some embodiments of the invention relate to systems, hardware, software, computer-readable media, and methods for accelerating data protection operations.

BACKGROUND

SCM (Storage Class Memory) is a type of flash memory (NAND flash memory) that includes a power source to ensure that data is not lost when power fails or is lost. SCM is very fast and the performance of SCM is somewhere between DRAM memory and conventional SSD flash memory. However, not all SCMs are created equal. Each SCM may provide different performance and may have different attributes. In addition, correctable and uncorrectable errors in an SCM may impact the performance of the SCM.

RDMA (Remote Direct Access Memory) technology is often used in conjunction with SCM. RDMA allows data to be moved into and out of SCM more quickly at least because an RDMA initiator can write directly to the SCM. When writing to a system that may provide multiple SCM namespaces, it is difficult to know which SCM namespace has the best performance and which SCM namespace should be selected for a particular operation.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 3 discloses aspects of latency and bandwidth information from a Heterogeneous Memory Attribute Table (HMAT);

FIG. 4 discloses examples of latency information;

FIG. 7 discloses aspects of an example computing device or system.

DETAILED DESCRIPTION OF SOME EXAMPLE EMBODIMENTS

Figure 1:
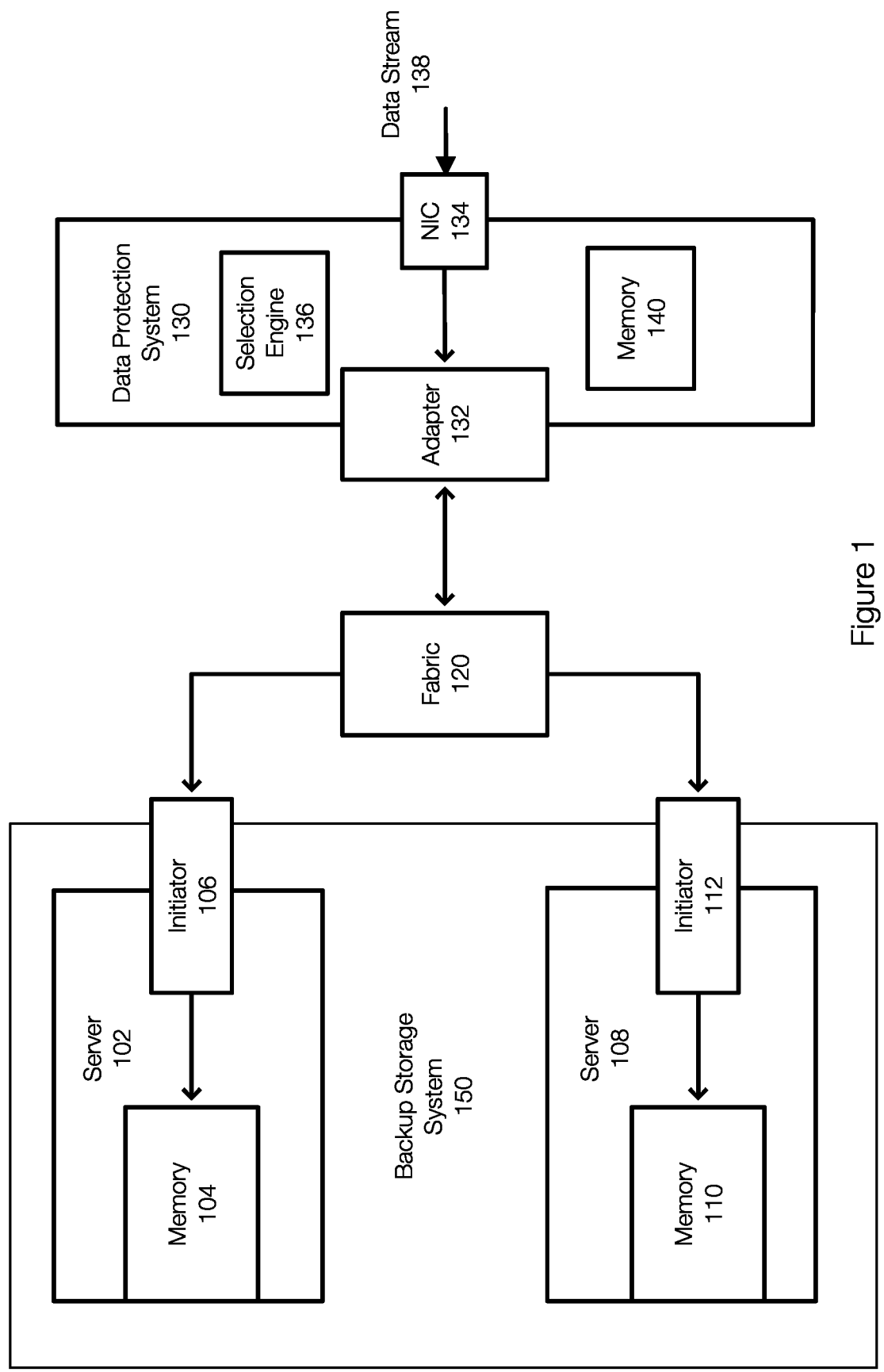
FIG. 1 discloses aspects of a data protection system configured to select a best performing memory of a backup storage system.

Embodiments of the present invention generally relate to data protection and data storage. More particularly, at least some embodiments of the invention relate to systems, hardware, software, computer-readable media, and methods for backup operations, which may include selecting memory for storing data such as backups, memory to memory transfer operations, or the like.

In general, example embodiments of the invention may be described with respect to SMC (Storage Class Memory) and RDMA (Remote Direct Access Memory). SCM may include, by way of example only, NAND flash memory. Further, embodiments of the invention relate to hybrid configurations, such as by way of example only, a combination of NVMe (Non-Volatile Memory Express) and SCM. However, embodiments of the invention are not limited thereto and may be applied to other memory types, transfer protocols, and computing configurations.

Embodiments of the invention relate to operations such as backup operations or memory to memory operations where the destination of the data being streamed or moved is selected in order to optimize the or improve the performance of the operation. For example, if a backup stream can be delivered to multiple destinations (e.g., namespaces) and each destination is associated with a different performance (e.g., in terms of latency and/or bandwidth), the overall performance of the operation is improved by selecting the destination that has the best performance. In some embodiments, the selection may be impacted by existing workloads or other operational factors.

In one example, the performance may be expressed in terms of latency (or delay) and/or bandwidth. The latency, however, may exist for different reasons. Latency, which impact the performance of an SCM, may exist in an SCM due to hardware specifications, errors (correctable and uncorrectable), other workloads, and the like.

Embodiments of the invention may determine, often in advance, bandwidth and latency information for each SCM or for each SCM namespace. The bandwidth and/or latency information of the SCM namespaces can be combined with latencies and/or bandwidths associated with data transport such that the namespaces can be ranked in terms of bandwidth and/or latency. The rankings can be considered when selecting a namespace for a data related operation. The best performing namespace can be selected according to the performance or according to the associated bandwidth and/or latency.

In addition, the information used in generating the rankings can be updated periodically, on-demand such as when initiating a data transfer, in response to an event in the computing environment, or the like. When there are changes in the underlying latency and bandwidth values, the rankings can be rearranged or updated. When there are changes in the latency and bandwidth values of the namespaces, other latencies such as fabric and source latencies may also be reevaluated as the rankings are reevaluated or rearranged.

More generally, the best IO (Input/Output) performance requires the best performing SCM. When a wide variety of workloads with different IO profiles are operating with an SCM system, embodiments of the invention can ensure that the applications requiring the highest level of performance can automatically take advantage of the best performing SCM.

FIG. 1 discloses aspects of accelerating backup operations by placing IOs to performance ranked memory or performance ranked namespaces. FIG. 1 illustrates a server 102 that is associated with or includes a memory 104 (e.g., an SCM namespace or multiple SCM namespaces). The server 108 is similarly associated with a memory 110, which may also be an SCM. The server 102 may include an initiator 106 and the server 108 may include an initiator 112. The initiators 106 and 112 may be RDMA initiators.

A data protection system 130 is configured to perform backup operations or other data transfer operations. For example, the data protection system 130 may operate to store or backup an incoming data stream 138 from a source in a backup storage system 150. The data protection system 130, which may be an appliance and may include a processor, memory, a network interface card (NIC) 134, or the like. The data protection system 130 may include an adapter 132 that allows the data protection system 130 to communicate with a fabric 120. The adapter 132 may be an RDMA adapter and the fabric 120 may be an RDMA fabric. The adapter 132 and the initiator 106/112 are configured to support direct memory transfer from the memory 140 to the memory 104 and/or the memory 110.

The backup storage system 150 may be a cloud-based storage system or other backup site. The backup storage system 150 may include multiple namespaces that are accessible through multiple servers, represented by servers 102 and 108, which servers provide memory 104 and 110.

When the data protection system 130 receives the data stream 138 from a source (e.g., a production system or other system having data that is protected by the data protection system 130), the data protection system 130 may initially store the data stream 138 in the memory 140. The data protection system 130 then transfers the data stored in the memory 140 to the memory 104 and/or 110 using RDMA in one example. This allows data from a production site to be stored at a backup site, which may be cloud based.

When transferring the data from the memory 140 to the storage system 150, a selection engine 136 may be configured to select the best performing server or memory for the transfer.

Figure 2:
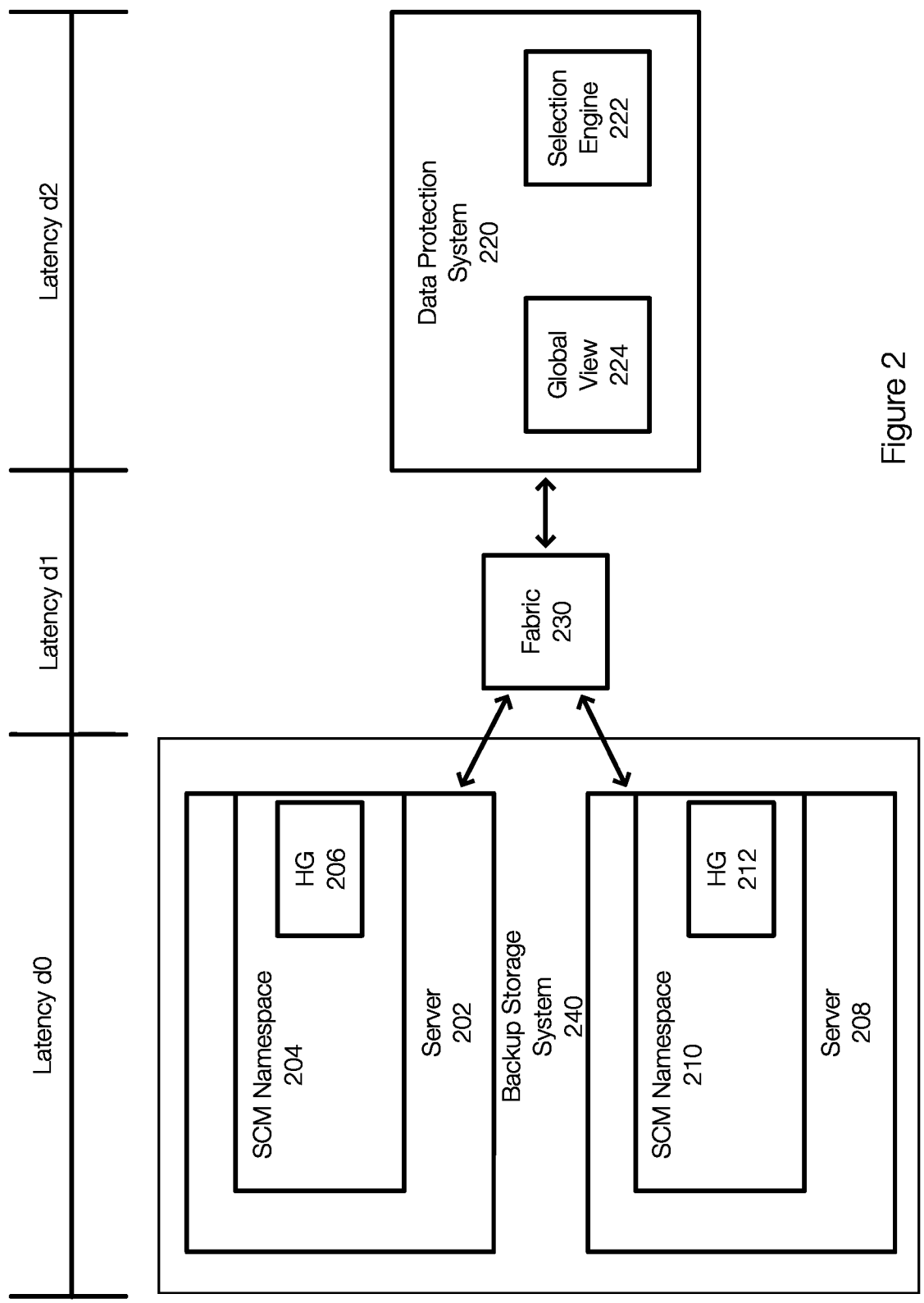
FIG. 2 discloses aspects of a heterogenous index and latencies associated with a data protection system that stores data to a backup storage system.

FIG. 2 discloses aspects of selecting a namespace for data transfer operations. FIG. 2 illustrates a data protection system 220, which is an example of the data protection system 130. The data protection system 220 includes a selection engine 222. The data protection system 220 is configured to store data in the backup storage system 240.

The backup storage system 240 includes a server 202 and a server 208, which are representative of multiple servers. The server 202 includes at least one SCM namespace represented by the namespace 204. The server 208 includes at least one SCM namespace represented by the namespace 210. The data protection system 220 communicates with the backup storage system 240 over a fabric 230, which is an example of an RDMA fabric.

In one example, the server 202 or the namespace 204 may be associated with a heterogeneous memory attribute table (HMAT), which is an example of Advanced Configuration and Power Interface (ACPI) table. The HMAT may provide information with users related to memory initiators and memory targets in a server 202 (e.g., between CPU and memory). The HMAT may provide information such as expected latency and bandwidth for various initiator and target pairs. In this example, there may be information available for each namespace on a server. Each server may also be associated with ACPI tables including an HMAT table, which may store topology information for all processors and memory.

In general, the HMAT and/or the ACPI describe memory attributes such as memory side cache attributes, bandwidth and latency details, related to memory proximity domains. These tables can be used to determine latency and bandwidth information with respect to the servers 202 and 208 themselves. In another example, the bandwidth and latency information can be derived from these tables.

A namespace, by way of example only, may define a contiguously addressed range of non-volatile memory such as an SCSI logical Unit (LUN) or an NVM express namespace. SCM may provide different categories of namespaces, such as app-direct namespaces and block namespaces. These types of namespaces may offer different performance and embodiments of the invention may also account for these differences.

FIG. 2 also illustrates a heterogeneous index (HG index) 206 and 212. The data protection system 220 or the selection engine 222 may create the HG indexes 206 and 212 based on attributes or information from the HMAT and/or other ACPI tables. Thus, attributes such as memory side cache information, memory hit information, memory miss information, high-bandwidth memory in order to reach peak performance, memory availability requirement, read latency, write latency, read bandwidth, write bandwidth, memory hierarchy levels, and the like are included in or used to create or generate the HG indexes 206 and 212.

The HG index 206 may be generated and stored at a predetermined location in the namespace 204. The HG index 212 may be generated and stored at a predetermined location in the namespace 210. Each of the servers 202 and 208 is associated with at least one HG index. In one example, an HG index may be created for each namespace.

The selection engine 220 may generate a global view 224 of all HG indexes 206 and 212. This allows the servers 202 and 208 and/or the namespaces thereon to be ranked in the global view 224. While the HG indexes 206 and 212 describe the latency of the servers 202 and 208, respectively, the global view 224 may also include other latencies such as the fabric latency and the source latency (e.g., the data protection system 220 latency). This allows the servers 202 and 208 or the namespaces 202 and 210 to be ranked in the global view 224 based on one or more latencies. The overall latency may be a sum of the destination latency, the fabric latency, and the source latency. The global view 224 may also include bandwidth information. For example, the best performing namespace may not be the one with the smallest latency. Rather, the available bandwidth may compensate for the delay. The global view includes information that allows the selection engine to account for bandwidth and/or latency when selecting a namespace for a given operation.

More specifically, FIG. 2 illustrates multiple latencies including latency do (destination latency), latency $d_1$ (fabric latency), and latency $d_2$ (source latency). The destination latency is introduced by or related the different topologies of the SCM memories (or namespaces) and their connections to the CPU. Different types (e.g., app direct, block) of namespaces may have different destination latencies. By reading HMAT, including HMAT locality, latency related to read, write, and access can be determined at the destination. For example, HMAT often provides information related to the CPU and memory. Memories that are closer to the CPU have less latency. Locality related to whether the memory is close to or further from the CPU. A namespace may have various level of memories with level 0 memory being the furthest from the CPU and level n being the closest to the CPU. The locality may impact latency. This information may be stored in the HG index, which is accessible by the data protection system 220 and which may be added to or incorporated into the global view 220.

The destination latency may be determined, in one example, as follows.

$$d_0 = \begin{cases} \left(w_r * \dfrac{1}{r} + w_w * \dfrac{1}{w}\right); \text{if workload is read intensive } w_r > w_w \\ \left(w_r * \dfrac{1}{r} + w_w * \dfrac{1}{w}\right); \text{if workload is write intensive } w_r < w_w \end{cases}$$

In one example, the total destination latency may be determined from a combination of information from the HMAT and the equation, which accounts for workloads that are read or write intensive. In the equation, $w_r$ and $w_w$ are, respectively, a weighted read value and weighted write value. The w and r are, respectively, the number of writes and the number of reads.

The fabric latency may be determined by sending a message or command to the fabric and waiting for a response. The response time to the command constitutes the fabric delay. The data protection system 220 may send, for example, a NULL command to the target (e.g., the server 202 or to each of the servers or to the namespaces) wait for response. A fabric delay may be determined for each namespace or for each server. The process of sending a command and waiting for a response may include, by way of example only, rpmem_common_init, rpmem_create, rpmem_cmd_run, rpmem_cmd_wait and rpmem_common_fini. This process is tailed to more accurately determine the latency introduced by the fabric.

If an event occurs that changes an attribute with respect to the namespaces or servers, an event may be triggered. A local agent at the server may be configured to update the HG index periodically, on command, when triggered, or the like. The local agent may update the HG index.

The source latency may be introduced by the data protection system 220 to access data to from the fabric 230. In one example, data travels from the data protection system 220 to the fabric 230 and this communication typically involves a network interface card or a smart network interface card. This latency is an example of the source latency. In one example, the source may send a NULL command to the network card and the time between issuing the command and the response is the source delay.

Thus, the overall latency is determined as follows in one embodiment: d (overall latency)=$d_0$ (destination latency)+$d_1$ (fabric latency) $d_2$ (source latency). The overall latency for each namespace is included in the global view. The global view may be updated regularly in light of changing conditions, including bandwidth usage)

FIG. 3 illustrates an example of SCM latency and bandwidth information. More specifically, the table 300 illustrates an example of SCM latency and bandwidth information obtained from HMAT.

FIG. 4 illustrates and example of initiator-target latency. The table 400 illustrates an example of initiator target latency from a log (e.g., a dmesg log). In this example, one of the initiator-target pairs may be the initiator (e.g., initiator 106 in FIG. 1) and the SCM namespace (e.g., the memory 104 in FIG. 1). The table 400 illustrates latencies for multiple initiator-target combinations.

Figure 5:
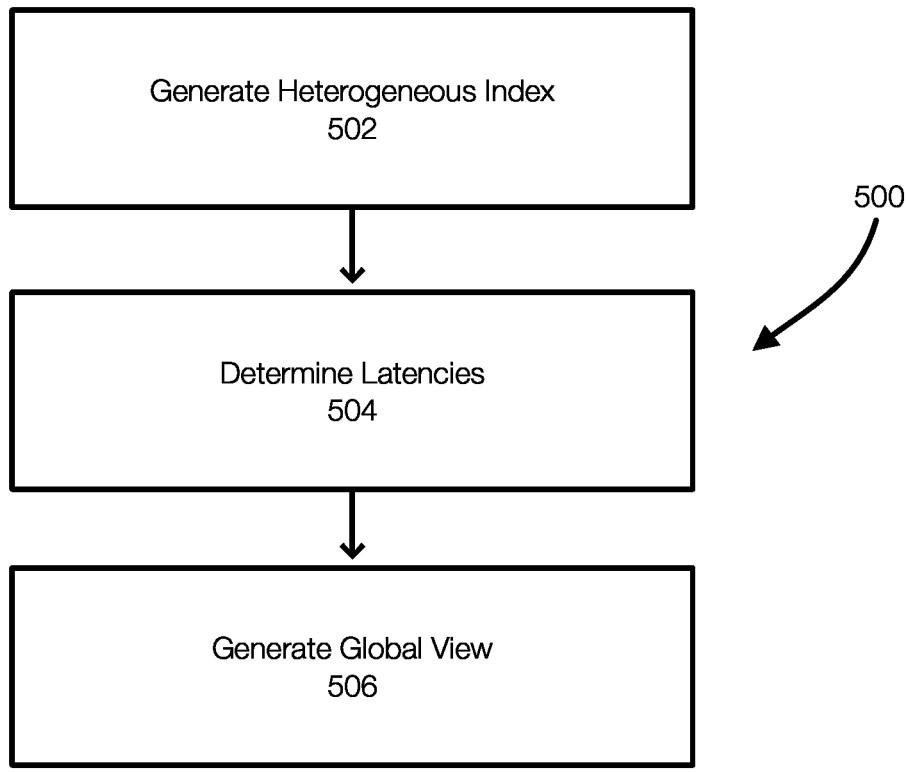
FIG. 5 discloses aspects of a method for identifying and ranking namespaces in a performance based manner.

FIG. 5 discloses aspects of determining latency in a computing system and/or for selecting a destination namespace for storing data. The method 500 includes generating 502 a heterogeneous index. The HG index may be generated from HMAT and/or other ACPI information. The HG index is generated and stored at the servers (e.g., the memory or SCM servers). The HG index may be stored in reserved memory. The location of the HG index is known and can be accessed by a data protection system. Generating the HG index may also include updating the HG index periodically or as changes are detected or on user command or when preparing for a data transfer operation.

The method 500 then determines 504 latencies. The destination latency can be determined from or derived from the HG index. The fabric latency can be determined by sending a command and waiting for a response. The source latency can be determined at the source. These latencies are then summed to generate an overall latency.

The global view may be generated 506 or updated after the latencies are determined. The global view, which may be stored at the data protection system may include information related to the namespaces available to the storage system. For example, the global view may store an overall latency for each namespace and a bandwidth for each namespace. The global view may specify each of the latencies represented by the overall delay. The global view may also rank the namespaces based on the overall latency and/or bandwidth. The latency and/or bandwidth are also representative of the performance and, as a result, the namespaces are effectively ranked by performance. Generating the global view may also include updating the global view periodically, based on events (e.g., an update to the HMAT or other ACPI tables or information, system upgrades, hardware changes), based on data transfer operations, or the like.

Figure 6:
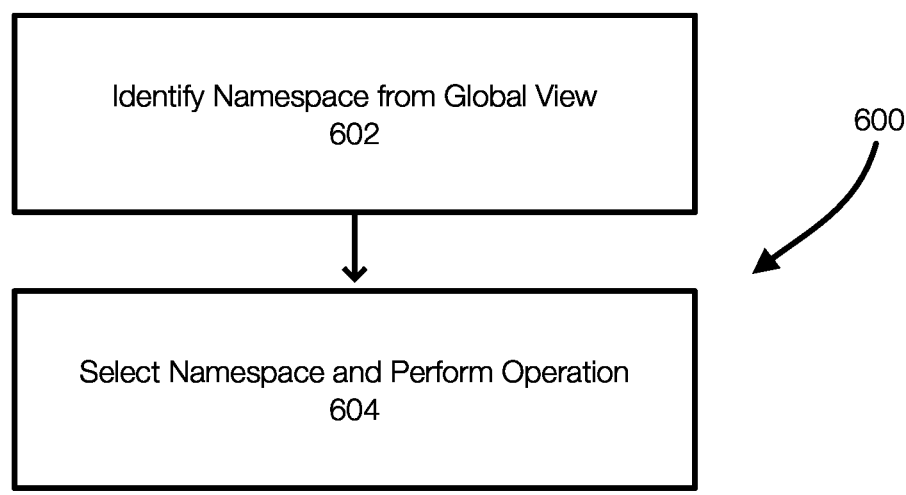
FIG. 6 discloses aspects of selecting a namespace for an operation.

FIG. 6 discloses aspects of performing operations including backup operations, memory copy or transfer operations, or the like or combination thereof. The method 600 may, in response to a need to transfer data, identify or select 602 a namespace from the global view. The namespace identified by the selection engine may be the highest ranked namespace. The identification may also account, if desired, for importance of the operation, availability of the namespace, use of the namespaces by other processes, or the like.

The namespace is thus selected and the operation is performed 604. Performing the operation may include sending data from the storage system to the namespace. If desired, data stored in the namespace may be moved to a more persistent memory.

Embodiments of the invention are able to move the most critical data to the best performing SCM based on the dynamically changing attributes of the SCM. The global view is dynamically updated such that the best performing SCM at a given time can be identified and used. Further, this allows data protection operations to be dynamically managed based on the global view. The user experience is further improved by using the heterogenous information of the SCM to aid in selecting the best performing SCM.

The selection of a namespace or an SCM, for example, can consider the latency of a given namespace, even if the latency is derived, and can account for latencies that are calculated in a workload aware manner. In other words, namespace access occurring at a given time impact the memory and can affect latency. For example, existing workloads may impact locality and resources, both of which may impact latency.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, operations. Such operations may include, but are not limited to, transfer operations, memory to memory operations (RDMA operations) data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include such as the Dell-EMC DataDomain storage environment, and Power Protect. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs.

The term VM embraces, but is not limited to, any virtualization, emulation, or other representation, of one or more computing system elements, such as computing system hardware. A VM may be based on one or more computer architectures, and provides the functionality of a physical computer.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect to the example method of Figure(s) XX that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method, comprising: generating a heterogeneous index for each namespace of a backup storage system, wherein the storage system includes a plurality of servers and each server is associated with at least one namespace and wherein the heterogeneous index allows a destination latency of the namespace to be determined, storing the heterogeneous index for each namespace at the associated server, determining a fabric latency and a source latency, wherein the fabric latency relates to a latency between a data protection system and the backup storage system, generating a global view that is stored at a data protection system, wherein the global view includes, for each namespace, an overall latency that includes the destination latency, the fabric latency, and the source latency, and selecting a namespace from the global view for an operation based on the overall latencies.

Embodiment 2. The method of embodiment 1, further comprising deriving the destination latency from the heterogeneous index, wherein the heterogeneous index includes data from an HMAT and or other ACPI tables.

Embodiment 3. The method of embodiment 1 and/or 2, wherein the namespace is a storage class memory.

Embodiment 4. The method of embodiment 1, 2, and/or 3, further comprising: determining the fabric latency by sending a command from the source and waiting for a reply, wherein the fabric latency includes a time from sending the command to receiving the reply, and/or determining the source delay accounts based on a time related to sending a command from the source to a network card and receiving a response to the command from the network card, wherein the network card that communicates with the fabric.

Embodiment 5. The method of embodiment 1, 2, 3, and/or 4, wherein the command is a NULL command.

Embodiment 6. The method of embodiment 1, 2, 3, 4, and/or 5, further comprising updating the global profile periodically or based on an event.

Embodiment 7. The method of embodiment 1, 2, 3, 4, 5, and/or 6, further comprising updating the heterogeneous index of each namespace.

Embodiment 8. The method of embodiment 1, 2, 3, 4, 5, 6, and/or 7, wherein selecting the namespace accounts for existing workloads, wherein the overall delay accounts for existing workloads.

Embodiment 9. The method of embodiment 1, 2, 3, 4, 5, 6, 7, and/or 8, wherein the global view includes bandwidth information for each namespace, wherein the selection is based on bandwidth and/or the overall latency.

Embodiment 10. The method of embodiment 1, 2, 3, 4, 5, 6, 7, 8, and/or 9, further comprising selecting the best performing namespace within the backup storage system based on the global view for the operation.

Embodiment 12. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-10

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'agent' or 'engine' may refer to software objects or routines that execute on the computing system. The different components, modules, agents, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system. There terms may also encompass hardware in some examples.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 7 any one or more of the entities disclosed, or implied, by the Figures and disclosure and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    generating a heterogeneous index for each namespace of a backup storage system, wherein the storage system includes a plurality of servers and each server is associated with at least one namespace and wherein the heterogeneous index allows a destination latency of the namespace to be determined;
    storing the heterogeneous index for each namespace at the associated server;
    determining a fabric latency and a source latency, wherein the fabric latency relates to a latency between a data protection system and the backup storage system;
    generating a global view that is stored at a data protection system, wherein the global view includes, for each namespace, an overall latency that includes the destination latency, the fabric latency, and the source latency; and
    selecting a namespace from the global view for an operation based on the overall latency.

2. The method of claim 1, further comprising deriving the destination latency from the heterogeneous index, wherein the heterogeneous index includes data from an HMAT or other ACPI table.

3. The method of claim 1, wherein the destination latency is determined from the heterogeneous index and a component that accounts for reads and writes of the workload.

4. The method of claim 1, further comprising:
    determining the fabric latency by sending a command from the source and waiting for a reply, wherein the fabric latency includes a time from sending the command to receiving the reply; and
    determining the source delay accounts based on a time related to sending a command from the source to a network card and receiving a response to the command from the network card, wherein the network card that communicates with the fabric.

5. The method of claim 4, wherein the command is a NULL command.

6. The method of claim 1, further comprising updating the global profile periodically or based on an event.

7. The method of claim 1, further comprising updating the heterogeneous index of each namespace and wherein the namespace is a storage class memory.

8. The method of claim 1, wherein selecting the namespace accounts for existing workloads, wherein the overall delay accounts for existing workloads.

9. The method of claim 1, wherein the global view includes bandwidth information for each namespace, wherein the selection is based on bandwidth and/or the overall latency.

10. The method of claim 1, further comprising selecting the best performing namespace within the backup storage system based on the global view for the operation.

11. A non-transitory storage medium having stored therein instructions that are executable by one or more hardware processors to perform operations comprising:
    generating a heterogeneous index for each namespace of a backup storage system, wherein the storage system includes a plurality of servers and each server is associated with at least one namespace and wherein the heterogeneous index allows a destination latency of the namespace to be determined;
    storing the heterogeneous index for each namespace at the associated server;
    determining a fabric latency and a source latency, wherein the fabric latency relates to a latency between a data protection system and the backup storage system;
    generating a global view that is stored at a data protection system, wherein the global view includes, for each namespace, an overall latency that includes the destination latency, the fabric latency, and the source latency; and
    selecting a namespace from the global view for an operation based on the overall latencies.

12. The non-transitory storage medium of claim 11, further comprising deriving the destination latency from the heterogeneous index, wherein the heterogeneous index includes data from an HMAT or other ACPI table.

13. The non-transitory storage medium of claim 11, wherein the destination latency is determined from the heterogeneous index and a component that accounts for reads and writes of the workload.

14. The non-transitory storage medium of claim 11, further comprising:
    determining the fabric latency by sending a command from the source and waiting for a reply, wherein the fabric latency includes a time from sending the command to receiving the reply; and
    determining the source delay accounts based on a time related to sending a command from the source to a network card and receiving a response to the command from the network card, wherein the network card that communicates with the fabric.

15. The non-transitory storage medium of claim 14, wherein the command is a NULL command and wherein the namespace is a storage class memory.

16. The non-transitory storage medium of claim 11, further comprising updating the global profile periodically or based on an event.

17. The non-transitory storage medium of claim 11, further comprising updating the heterogeneous index of each namespace.

18. The non-transitory storage medium of claim 11, wherein selecting the namespace accounts for existing workloads, wherein the overall delay accounts for existing workloads.

19. The non-transitory storage medium of claim 11, wherein the global view includes bandwidth information for each namespace, wherein the selection is based on bandwidth and/or the overall latency.

20. The non-transitory storage medium of claim 11, further comprising selecting the best performing namespace within the backup storage system based on the global view for the operation.

* * * * *